(12) United States Patent
Tajik

(10) Patent No.: US 9,961,955 B2
(45) Date of Patent: May 8, 2018

(54) METHOD FOR PRODUCING A COMPOSITE MOLDED BODY AND CORRESPONDING COMPOSITE MOLDED BODY

(71) Applicants: ORTHO-NOVA GmbH für Orthopädie-Technik, Wiesbaden-Biebrich (DE); Mahmoud Reza Tajik, Wiesbaden (DE)

(72) Inventor: Mahmoud Reza Tajik, Wiesbaden (DE)

(73) Assignee: ORTHO-NOVA GmbH für Orthopädie-Technik, Wiesbaden-Biebrich (DE)

(*) Notice: Subject to any disclaimer, the term of this patent is extended or adjusted under 35 U.S.C. 154(b) by 310 days.

(21) Appl. No.: 14/910,238

(22) PCT Filed: Aug. 5, 2014

(86) PCT No.: PCT/EP2014/066766
§ 371 (c)(1),
(2) Date: Feb. 4, 2016

(87) PCT Pub. No.: WO2015/018809
PCT Pub. Date: Feb. 12, 2015

(65) Prior Publication Data
US 2016/0166001 A1     Jun. 16, 2016

(30) Foreign Application Priority Data
Aug. 5, 2013   (DE) .................. 10 2013 108 430

(51) Int. Cl.
A43B 1/14       (2006.01)
B29C 70/44      (2006.01)
(Continued)

(52) U.S. Cl.
CPC ................ *A43B 1/14* (2013.01); *B29C 33/58* (2013.01); *B29C 33/60* (2013.01); *B29C 51/10* (2013.01);
(Continued)

(58) Field of Classification Search
CPC ........... A43B 1/14; B29C 70/44; B29C 70/54; B29C 70/542; B29C 33/58; B29C 33/60;
(Continued)

(56) References Cited

U.S. PATENT DOCUMENTS 5,009,687 A    4/1991   Kromrey
5,123,985 A    6/1992   Evans et al.
(Continued)

FOREIGN PATENT DOCUMENTS

DE    4101226 A1    7/1992
DE    19930000 A1   1/2001
(Continued)

OTHER PUBLICATIONS

International Search Report, PCT/EP2014/066766, dated Aug. 5, 2014 (5 pages).
(Continued)

*Primary Examiner* — Michael C Miggins
(74) *Attorney, Agent, or Firm* — The Maxham Firm

(57) ABSTRACT

An apparatus and method for producing a composite molded body in which several layers of prepregs are laid over one another, adhesively bonded to each other and cured under pressure and/or vacuum, wherein the prepreg layers laid over one another are introduced into an airtight shell, the interior of the shell is connected to a vacuum source and evacuated and the molded body is cured together with the shell in a furnace. In order to develop a corresponding method and a composite molded body which can be produced with it, which does not have at least some of the above
(Continued)

Figure 1:
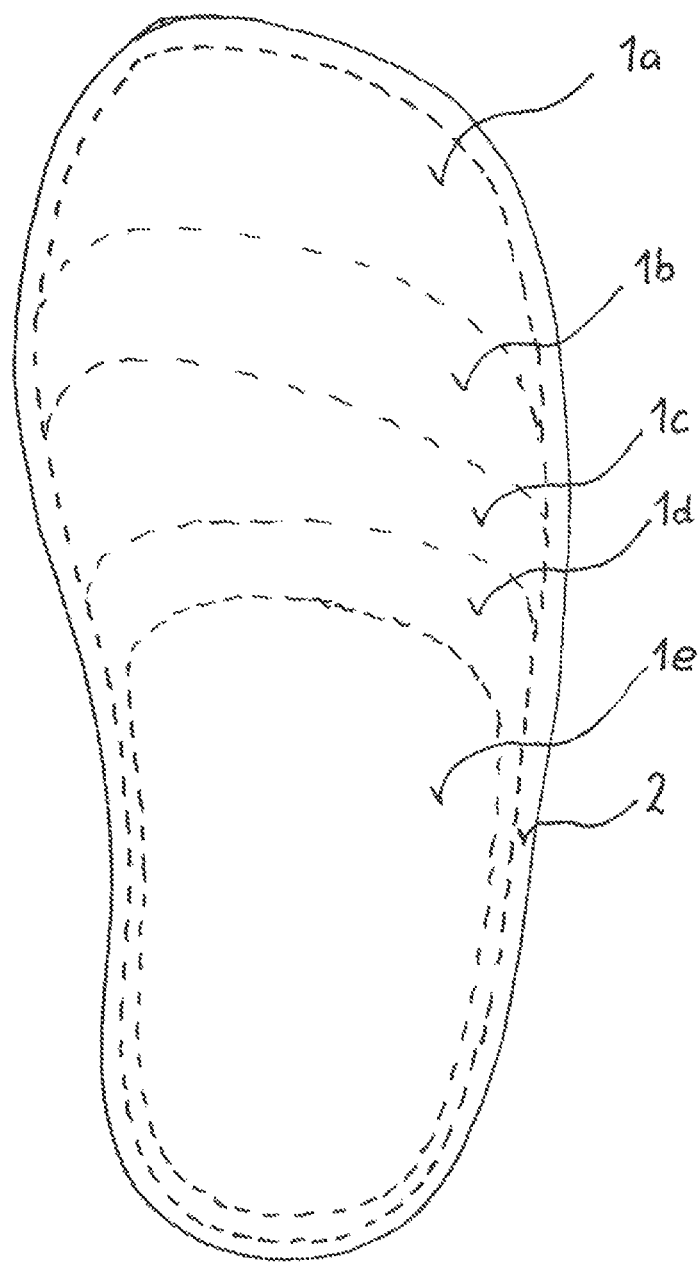

disadvantages, an antifriction agent is introduced into the interior of the shell before the evacuation of the shell.

22 Claims, 2 Drawing Sheets

(51) Int. Cl.
| | |
|---|---|
| B29C 70/54 | (2006.01) |
| B29C 33/58 | (2006.01) |
| B29C 33/60 | (2006.01) |
| B29C 51/10 | (2006.01) |
| B29C 70/18 | (2006.01) |
| B29K 31/00 | (2006.01) |
| B29L 31/50 | (2006.01) |

(52) U.S. Cl.
CPC ............. *B29C 70/44* (2013.01); *B29C 70/54* (2013.01); *B29C 70/542* (2013.01); *B29C 70/18* (2013.01); *B29K 2031/04* (2013.01); *B29L 2031/504* (2013.01)

(58) Field of Classification Search
CPC ..... B29C 70/18; B29C 51/10; B29K 2031/04; B29L 2031/504
See application file for complete search history.

(56) References Cited

U.S. PATENT DOCUMENTS

| | | |
|---|---|---|
| 5,322,665 A | 6/1994 | Bernardon et al. |
| 8,398,795 B2 | 3/2013 | Berchtold et al. |
| 8,778,106 B2 | 7/2014 | Bech |
| 8,778,479 B2 | 7/2014 | Bech |
| 9,044,906 B2 | 6/2015 | Theinert et al. |
| 9,180,606 B2 | 11/2015 | Bech |
| 9,193,101 B2 | 11/2015 | Gummel et al. |
| 9,238,337 B2 | 1/2016 | Kiyomi et al. |
| 9,398,795 B2 | 7/2016 | Gupta et al. |
| 2004/0115299 A1 | 6/2004 | Potter et al. |
| 2007/0108665 A1 | 5/2007 | Glain et al. |
| 2010/0040886 A1 | 2/2010 | Luinge et al. |
| 2011/0209812 A1 | 9/2011 | Bansal et al. |

FOREIGN PATENT DOCUMENTS

| | | |
|---|---|---|
| DE | 102007027113 A1 | 12/2008 |
| DE | 102011114494 A1 | 4/2013 |

OTHER PUBLICATIONS

Chinese Official Action to Chinese patent application 201480044377.5 (co-pending application), dated Feb. 4, 2017 (5 pages).

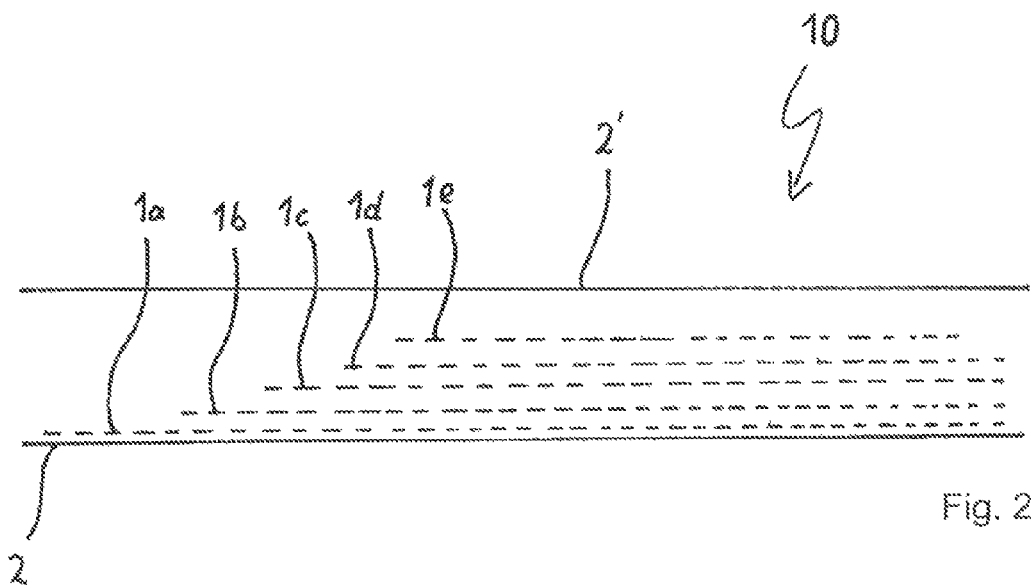
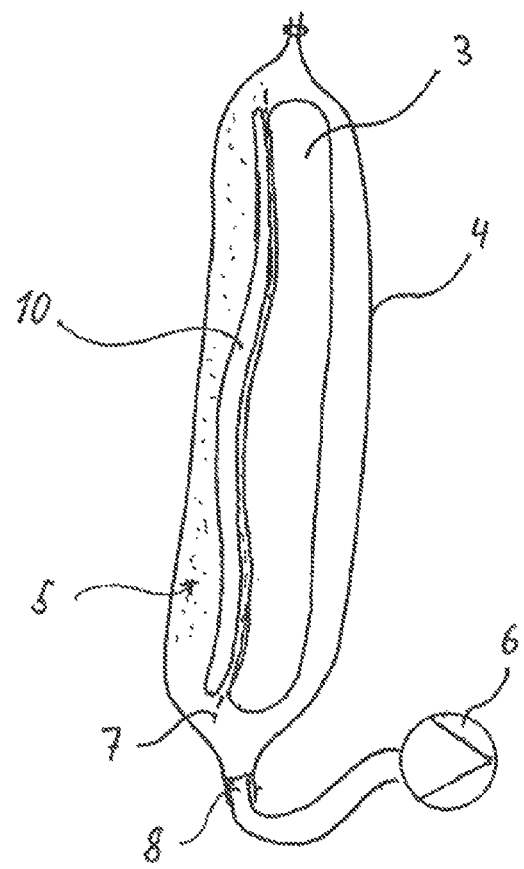

METHOD FOR PRODUCING A COMPOSITE MOLDED BODY AND CORRESPONDING COMPOSITE MOLDED BODY

The present invention relates to a method for producing a composite molded body which consists of several layers of pre-impregnated fibers (so-called "prepregs"), which are laid over one another and adhesively bonded to each other under pressure or vacuum and then cured, wherein the layers made of prepregs laid over one another are introduced into an airtight shell, the interior of the shell is connected to a vacuum source and evacuated and the molded body is cured in a furnace together with the shell.

The invention also relates to a composite molded body which was produced according to a corresponding method.

Meanwhile, corresponding composite molded bodies are known for numerous applications in which, on the one hand, very high strength and, on the other hand, low weight are required. Particularly prominent examples are the fuselages and wings of the newest generation of wide-body aircraft, wherein however corresponding techniques have also long been used for wind turbines, in boatbuilding and in the construction of light aircraft and also in other fields.

For applications in which a particular rigidity and strength of the composite molded bodies are required accompanied by small dimensions, composite materials with carbon fibers, which are referred to here as "C fibers" for short, are primarily used. For example, in the meantime, most bicycle frames for high-performance racing are also manufactured from such carbon composites.

A further important area of application of C fiber prepregs and composite molded bodies produced therefrom is in the field of orthopedics since very often similarly high demands in terms of strength, rigidity, stability, low weight and low volume are placed on prostheses and orthoses as in the fields mentioned above.

However, carbon fiber prepregs and products produced therefrom also have a disadvantage since they can only be combined with other fiber prepregs or composite materials poorly or with considerable outlay and their visual appearance is also not always desirable for the products in question as they are generally black or dark gray in color and fiber or striped structures of the fiber material may also be visible and the surface cars have adhesions of auxiliary material.

In the production of a composite material made of carbon fibers, after typically several layers of prepregs have been laid over one another and adhesively bonded, these layers (for example arranged on a porous mold) are encased by a sealed film which is then evacuated and subsequently baked or cured in s furnace at approx. 110° C. In this connection, "adhesively bond" does not mean the application of any additional adhesive. Rather the prepregs bond adhesively simply by being laid over one another since the corresponding matrix material with which the fibers are impregnated has corresponding adhesive properties.

A part of the matrix material escapes during the evacuation and, during the curing, adheres to the shell which, as a result, also partially wrinkles and curls up which leads to an uneven and unattractive surface.

In general, the matrix material is a resin, in particular a synthetic resin or duromer, an elastomer or a thermoplastic material which, even in the uncured state, has more or less adhesive properties and sticks together prepregs which have been laid over one another and pressed together, but only joins these together firmly and practically inseparably to form an integrated molded body after curing.

If it is desired to join other layers and in particular prepregs made from fibers other than C fibers to C fiber prepregs which have a reasonably smooth, clean surface made of matrix material, theoretically absorption and protective layers would have to be arranged over them such that the product surface is no longer visible during curing in the furnace and corrective action could also no longer take place. This would lead to very high wastage with the result that in practice corresponding products are not on the market and also are not known.

Depending on the area of application, lacquer or paint can be applied to corresponding carbon composites or composite molded bodies which, however, requires additional work processes and is disadvantageous for the weight of the end product. In addition, the processing of prepregs made of carbon fibers is difficult and also, as a rule, finished carbon-fiber products which are produced from several layers of C fiber prepregs laid over one another which are adhesively bonded to each other, pressed or evacuated and cured, have sharp edges on their margins which can easily cause injuries and from which individual fiber fragments can also escape which can be damaging to health on contact and inhalation. Stress and breakage of C fiber composite materials can also create sharp, frayed edges which can cause very unpleasant injuries.

Against this state of the art, the object of the present invention is to develop a method and a composite molded body which can be produced with it which does not have at least some of the above disadvantages.

In a preferred variant, the aim is to produce a composite molded body which has, on the one hand, the strength and rigidity and elasticity of C fiber composites but, on the other hand however, has a better flexural behavior and a greater elongation at break and has an attractive exterior which can be designed largely as desired without subsequent coating or painting.

In terms of the method mentioned at the outset, this object is achieved by introducing an antifriction agent (lubricant) into the interior of the shell before the evacuation of the shell. The inventor has established that such an antifriction agent apparently leads to this shell being able to be released from the molded body without damage and without residues even after curing in the shell. The molded body is thereby freed from the material of the shell and the surface is determined solely by the surface of the uppermost layer of a prepreg or another outer coating under the shell, as well as the cured matrix material penetrating through this layer or coating.

It is to be understood that the antifriction agent used is to be selected such that it doss not join to the matrix material of the prepregs at the temperatures between 100 and 120° C. arising during the curing.

In a particular variant it is provided that at least one further outer layer of the prepregs consists mainly of fibers which are not C fibers, in particular are fibers from the group which consists of mineral fibers, natural fibers and plastic fibers.

Almost all of this type of fibers have a better elongation at break behavior than carbon fibers, even if some of them do not lead to composite molded bodies which are as flexurally resistant as composite molded bodies made from C fibers. The further prepreg layer which does not consist of impregnated C fibers, preferably only comes into contact with a C fiber layer on one of its sides. In practice this means that the further layer, relative to one or more C fiber layers in each case forms the outer layer, wherein however it is not excluded that, on the outer side of the further layer, one or more additional layers, which do not consist of C fibers and possibly are not even pre-impregnated, are also applied. An advantage of such a material which does not consist of C fibers is that during processing, in particular during grinding, no carbon fiber dust, which is to be classified as hazardous to health, is produced from the outer layer.

In principle if is also possible in addition for one or more layer(s) which do not consist of C fibers to be embedded between C fiber layers. Likewise, bodies made of other materials, such as for example made of metal or plastic, in particular a molded part can also be embedded in the composite molded body between C fiber layers or between a C fiber layer and a prepreg which does not consist of C fibers. Such an article integrated in a composite molded body can be completely encased in the layers of the composite material or can also protrude from the composite molded body in one or more places.

In the past, there was predominantly a problem in ensuring an even surface contact between the layers when joining prepregs made of C fibers with prepregs made of other fibers without creating wrinkles or bubbles and without adhering to an outer shell. Therefore such molded bodies are hitherto not known.

This problem is overcome by the present invention by means of the corresponding method for producing a composite molded body in which several prepregs are laid over one another, adhesively bonded to each other and cured under pressure or vacuum, wherein at least one layer made of a C fiber prepreg is used, wherein furthermore according to the invention at least one further prepreg made of another fiber material of the type mentioned above is applied to the at least one C layer and adhesively bonded, the molded part prepared in this way is encased in an airtight shell, wherein an antifriction agent is introduced into the inferior of the shell or has already been introduced into the shell before the encasing. The interior of the shell is then connected to a vacuum source in a known manner and evacuated. The molded body is subsequently cured at increased temperature for several hours in the shell.

The flexible, airtight shell in conjunction with the introduced antifriction agent ensures that the shell, during the evacuation thereof, can slide on the coating, which is respectively in contact with the shell, which results in a wrinkle-free join forming between the further layer and the C layers. Above all, however, the antifriction agent ensures that the shell, which generally consists of a plastic film, can be subsequently peeled off the uppermost coating of the layers of the cured molded part which are adhesively bonded to each other without difficulty.

The cured matrix or binding material of the composite molded part thus forms a smooth surface coating. In particular, it is also possible to apply onto the further coating an outer coating made of a textile material, which becomes saturated during the curing and by means of the matrix material being vacuum pumped, without itself having been pre-impregnated. Such a textile coating then determines the outer visual appearance of the molded part and is simultaneously saturated with the matrix material and an integral component of the composite molded body.

For their part, the different layers can also be applied to a porous mold which makes it possible to also expose the molded body to a vacuum from the side on which it bears on a mold. In such a variant, it can be advantageous if a film treated with antifriction agent is arranged between mold and molded body.

In a preferred embodiment of the present invention the further layer which is in contact with the C fiber layer contains predominantly or exclusively fibers made of HPPE (high-performance polyethylene), wherein corresponding polyethylene fibers are produced and marketed by the Royal DSM N.V. company under the trade name "Dyneema".

The corresponding prepregs are also known as "Dyneema prepregs".

Moreover, in the preferred embodiment of the invention, several C fiber layers are arranged over one another in the composite molded body, for example with successively smaller outlines in order to produce different areas or sections of the molded part with different rigidity and elasticity, wherein the C fiber layers are arranged on each other such that a layer with a respectively smaller outline does not protrude beyond a previous larger layer, wherein finally the further layer which does not consist of C fibers also has a larger outline than all of the C fiber layers with the result that the further layer covers all of the C fiber layers.

In the preferred embodiment of the invention, the at least one or a corresponding stack of several C fiber layers is covered on both outer sides by in each case one further layer, wherein the further layers have a substantially identical and larger outline than ail of the C fiber layers and, in this way, protrude beyond the C fiber layers along the whole circumference and are in direct contact with each other along the outer, projecting margins. By this means, the C fiber layers are completely encased by two further layers and, for example when HPPE is used as fiber material of the outer layers, no sharp outer edges are formed which could cause injuries or release small fiber fragments because the HPPE fibers, in spite of an extremely high tensile strength, behave more like textile fibers.

Furthermore, in this preferred variant, no carbon fiber dust can form even when the edges are ground which otherwise requires particular protective measures against any inhalation or contact with the skin during the grinding of molded parts made of carbon composites.

The composite molded body formed in this way, the outsides of which are formed in each case by a further layer, for example made of HPPE fibers, while several inner layers are formed from C fiber prepregs, has substantially the same rigidity and bending strength as a composite molded body produced only from the corresponding C layers. At the same time however, this molded body has a significantly better elongation at break behavior and can therefore be bent more strongly without breaking on the action of greater bending forces, wherein even when breaking, in the first instance, only the inner C fiber layers break, but are still encased by the further layers, the fibers of which break less easily, in particular if they consist of HPPE.

In addition, the further layer can also be covered by an additional layer which does not necessarily have to be a pre-impregnated prepreg material but, for example, can also be a thin film or a thin textile layer. Such a further layer is arranged on the composite molded body in the same way as the previously described further layer was arranged on the C fibers and is likewise arranged in a flexible shell with antifriction agent, whereupon the shell is evacuated and the whole package is cured with the result that, in this way, the additional layer is also securely joined to the further layer lying beneath. The curing can also, optionally, take place in stages.

A PVA film tube is preferably used as shell for the corresponding molded body.

The antifriction agent used is preferably a powder antifriction agent, in particular an antifriction agent provided for silicone and urethane, such as can be obtained tor example from the Otto Bock company in D37115 Duderstadt as a specialist powder antifriction agent for silicones and urethanes.

The present invention is in particular well suited for the production of prostheses or orthoses without an additional supporting structure because corresponding molded bodies can be produced to be so stable per se that they can, for example, replace or support human limbs such as e.g. lower legs and can bear a person's weight, it is understood that corresponding prosthetic and orthotic parts can optionally also have additional joint elements and the like. In the use for prostheses and orthoses, the composite molded bodies according to the invention have the decisive advantage that they can be produced directly with an outer layer which has a desired color or a desired pattern without subsequent painting or coating. The outer layer can, for example, be a textile or film layer which reproduces a skin color or skin structures and which is an integrated component of the composite molded body, wherein a corresponding film layer would preferably be porous.

Further advantages, features and application possibilities of the present invention become clear by means of the complete description of an embodiment example and the associated Figures.

The production of an orthopedic foot sole part is described in the following embodiment example.

FIG. 1 shows schematically a top view of an orthopedic foot sole part,

FIG. 2 again shows schematically a layer sequence of prepregs from which the foot sole part according to FIG. 1 could consist, and FIG. 3 shows a corresponding foot sole part arranged on a mold in a shell with antifriction agent, before the evacuation and the curing.

In FIG. 1, the top view of a foot sole part 10 which can be, for example, an orthopedic shoe insert or also part of a prosthesis or orthosis, can be seen schematically, wherein the foot sole part 10 can be connected to a lower leg cuff via suitable joints and optionally also an integral extension.

In the embodiment example shown, the fool sole part 10 consists of several layers of prepregs, namely a first Dyneema prepreg 2, as well as several C fiber prepregs 1a-1e, which have successively smaller outlines than the respectively previous prepreg. First of all, a C fiber prepreg 1a, the outline of which around the circumference is slightly smaller and offset towards the inside vis-à-vis the margin of the prepreg 2, is applied to the Dyneema prepreg 2. The further prepregs 1b, 1c and 1d, which are applied to the prepreg 1a or successively to each other, have, at the rear or lower part of the foot sole, the same outline as the prepreg 1a but, towards the front to the front of the foot are formed shorter which results in the finished molded part being thinner and thus more elastic and more flexible in the front part. Finally, a further C fiber prepreg 1e has an even smaller outline vis-à-vis the previous prepregs and reinforces the rear central part of the foot sole 10.

Not shown in FIG. 1 is a further prepreg 2' which is applied over the C fiber layers 1a-1e and is congruent with the prepreg 2 so that the outer projecting edges of if can be adhesively bonded to each other and joined. Prepreg 2' is, however, visible in FIG. 2.

FIG. 2 shows, purely schematically, the succession of coatings or prepreg layers 2, 1a-1e and 2' corresponding to a greatly height exaggerated illustration of a longitudinal section from the heel to the tip of the foot sole part 10. In practice the foot sole part 10 has a thickness of only 1 to 2 mm, wherein the thickness of the molded parts according to the invention can vary in wide ranges between approximately 0.1 mm and several cm.

FIG. 3 illustrates a variant of the method according to the invention for producing a corresponding composite molded body 10. In this case, the composite molded body 10 built up from the same or a similar layer sequence as in FIGS. 1 and 2 is applied in layers to the mold 3 and adapted to this mold. The mold can be, for example, the cast of a natural body part. Here too, the molded part 10 is shown significantly thicker in relation to the length than it would be in reality.

The individual prepreg layers can either first of all be laid over one another on a flat surface and adhesively bonded and then pressed on or molded on the mold surface or they can be applied one after the other directly on the mold and the respectively previous coating or prepreg layer. According to a variant, a film 7 coated with antifriction agent, which can be adhesively bonded on one side to the molded part 3 and has an antifriction agent coating on the side facing the molded part 10, could also be applied first of ail between the mold 3 and the molded body 10. The antifriction agent is preferably a powder antifriction agent, such as is used in orthopedics for silicone and urethane parts and can be obtained, for example, from the Otto Bock company in Duderstadt.

In any case, the molded part 10 with or without mold 3 is introduced into an outer, airtight shell 4, wherein in this a powder antifriction agent 5, which is indicated here only schematically in the form of small dots, was previously introduced into the shell.

Depending on the size of the molded part 10, fractions of a gram or one or more grams of the powder antifriction agent are enough to cover the inner surface of the outer shell sufficiently with the antifriction agent 5. The outer shell is preferably a PVA tube, the upper end of which is connected in an airtight manner by means of a clip or with the aid of a heat-resistant tie.

At the lower end, the sleeve 4 which preferably consists of PVA material is connected in a sealing manner with an intake nozzle 8 of a pump 6 with the aid of which the shell 4 is evacuated for a few minutes up to, for example, an hour, wherein excess matrix material escapes from the molded body. The entire shell, preferably still with the intake nozzle 8 connected and with continued vacuum pumping, is then introduced into a heating furnace which heats the shell 4 including all of the parts included in it to a temperature of for example 100-120° C., wherein further matrix material of the prepregs used escapes from the molded body and is absorbed, for example, by the mold and the rest cures and joins all of the prepreg layers inseparably to each other to form an integral molded body.

The curing procedure can take several hours, wherein the use of a PVA shell makes it possible to observe the surface of the molded part 10 and optionally to intervene in order to distribute the matrix material more evenly if any irregularities form and to smooth unevennesses.

The visual appearance of the corresponding molded body 10 is then largely determined by the appearance of the outer prepreg layers, in the case of the embodiment example of FIGS. 1 and 2 that is by the corresponding Dyneema prepregs. However, before the curing, a layer made of a textile material, which absorbs at least part of the escaping matrix material during the curing, is impregnated by it and is also an integral component of the composite molded body, can also be optionally applied to the Dyneema prepreg. Optionally, it is also possible to apply such a textile coating subsequently, after the curing of the molded body 10 and to warm this again and/or to apply a corresponding uncured matrix coating to the molded part in order in this way to securely bond the outer textile coating to the molded part.

Here too, again, a shell provided with antifriction agent 5 is used which makes it possible, after the application and curing of the molded part including the upper textile coating to peel the shell 4 off the molded part again without difficulty and to remove it. The molded part can also be provided on both sides with a corresponding textile layer, in particular if a corresponding mold 3 is not required.

The use according to the invention of an antifriction agent therefore makes it possible to produce corresponding composite molded bodies made of prepregs with most varied fibers and combinations thereof with a smooth, clean surface without the shell material, which is required in the corresponding production method during the evacuation and curing, adhering to the molded part, wherein the mechanical properties of the molded part can also be varied and improved in wide ranges, and the appearance of the surface can be designed in almost any way desired.

The invention claimed is:

1. A method for producing a composite molded body in which several layers of prepregs are laid over one another, adhesively bonded to each other and cured under pressure and/or vacuum, the method comprising:
   introducing the prepreg layers laid over one another into an airtight shell;
   connecting the interior of the shell to a vacuum source;
   introducing an antifriction agent into the interior of the shell; then
   evacuating the interior of the shell to form the molded body; and
   curing the molded body together with the shell in a furnace.

2. The method according to claim 1, wherein the shell is comprised of a PVA film tube.

3. The method according to claim 1, wherein the antifriction agent is a powder.

4. The method according to claim 3, wherein the antifriction agent powder has characteristics of antifriction agent powders used in orthopedics for silicone and urethane parts.

5. The method according to claim 1, wherein at least one prepreg layer is made of a carbon fiber prepreg, at least one further prepreg layer made of another fiber material is applied to the at least one carbon fiber layer and adhesively bonded, and the molded body is cured at increased temperature;
   wherein the at least one further prepreg layer is comprised mainly of fibers which are not carbon fibers and which are selected from the group which consists of mineral fibers, natural fibers, and plastic fibers.

6. The method according to claim 5, wherein a prepreg made of high-performance polyethylene (HPPE) is used as the at least one further prepreg.

7. The method according to claim 6, wherein one or more carbon prepregs are laid over one another and each covered on both sides with an HPPA prepreg, which project beyond the outline of the carbon prepregs and these layers are introduced into the shell provided with the antifriction agent.

8. The method according to claim 5, wherein a film or a textile material layer is applied to the at least one further prepreg layer on a side of it facing away from the carbon fiber layers and is introduced together with the prepreg layers with antifriction agent into the shell which is subsequently evacuated.

9. The method according claim 1, wherein the molded body consisting of prepregs laid over one another which is not yet cured is applied to a porous molded body and introduced together with the molded body into the airtight shell.

10. The method according to claim 9, wherein the mold is the cast or the plastic impression or replica of a human body part.

11. The method according to claim 9, wherein a film, which is provided with an antifriction agent at least on the side facing the molded body, is inserted between the mold and the molded body.

12. A composite molded body which consists of several layers of pre-impregnated fibers (prepregs) which are joined to each other, which are laid over one another and thereby adhesively bonded to each other and evacuated in a shell and subsequently cured in the shell, wherein the molded body has been produced according to the method according to claim 1, and a surface of the molded body which is in contact with the shell during the curing is completely freed from the material of the shell.

13. The composite molded body according to claim 12, wherein at least one of the prepreg layers has at least predominantly carbon fibers and at least one further layer consists mainly of fibers which are not carbon fibers, and contains fibers selected from the group which consists of mineral fibers, natural fibers, and plastic fibers.

14. The composite molded body according to claim 13, wherein the at least one further layer in contact with a carbon fiber layer contains primarily high-performance polyethylene (HPPE) fibers.

15. The composite molded body according to claim 13, wherein the outline of the at least one carbon fiber layer lies completely within the outline of the at least one further layer.

16. The composite molded body according to claim 13, wherein the at least one carbon fiber layer is covered on both sides in each case by at least one of the at least one further layer.

17. The composite molded body according to claim 16, wherein the at least one further layer comprises two further layers covering the carbon fiber layer on both sides and are joined directly to each other outside of the outline of the carbon fiber layer.

18. The composite molded body according to claim 13, wherein the at least one further layer is covered on at least one side of the molded body by a layer of a textile material which is not pre-impregnated or a plastic film.

19. The composite molded body according to claim 12, wherein the molded body has at least two and preferably at least three layers made of carbon fiber prepregs lying over one another.

20. The composite molded body according to claim 19, wherein carbon fiber layers lying over one another have successively smaller outlines and in each case do not protrude beyond the outline of the previous layer, wherein the carbon fiber layer with the largest outline is in contact with a further layer.

21. The composite molded body according to claim 12, wherein the molded body is at least part of a prosthesis or orthosis.

22. The composite molded body according to claim 21, wherein an article made of metal or another material comprises a molded part integrated into the composite molded body.

* * * * *